E. J. BARTELLS.
CAMERA.
APPLICATION FILED MAY 27, 1915.

1,182,447.

Patented May 9, 1916.
4 SHEETS—SHEET 1.

WITNESS
O. Johnson

INVENTOR
Edwin J. Bartells

BY
C. D. Haskins
ATTORNEY

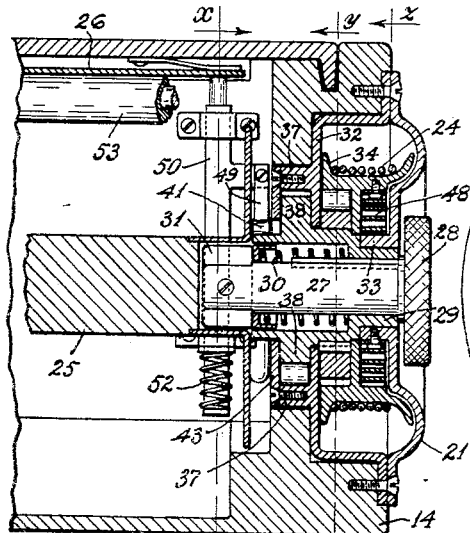
FIG. 3
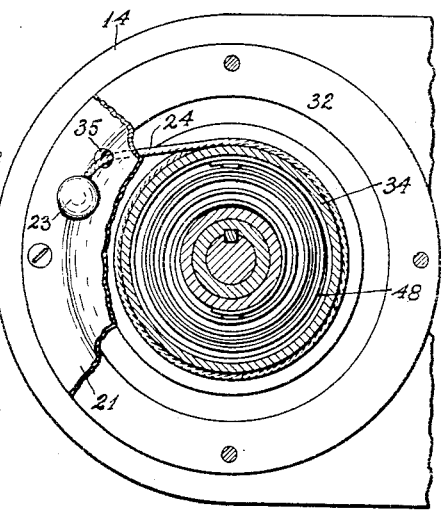
FIG. 4
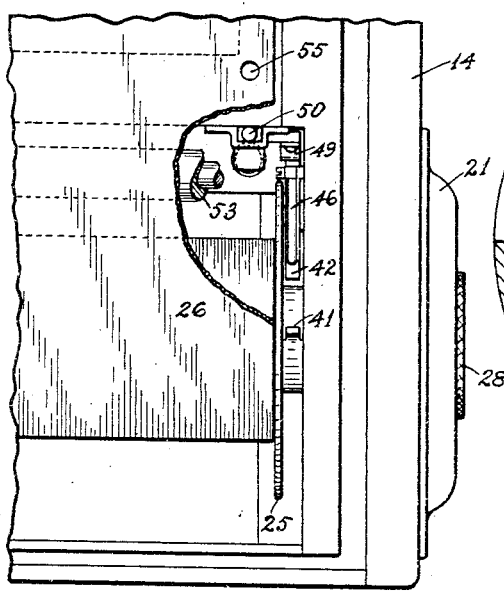
FIG. 6
FIG. 5
INVENTOR
Edwin J. Bartells

E. J. BARTELLS.
CAMERA.
APPLICATION FILED MAY 27, 1915.

1,182,447.

Patented May 9, 1916.
4 SHEETS—SHEET 3.

WITNESS
O. Johnson

INVENTOR
Edwin J. Bartells
BY
C. D. Haskins
ATTORNEY

UNITED STATES PATENT OFFICE.

EDWIN J. BARTELLS, OF SEATTLE, WASHINGTON.

CAMERA.

1,182,447.      Specification of Letters Patent.      Patented May 9, 1916.

Application filed May 27, 1915. Serial No. 30,728.

*To all whom it may concern:*

Be it known that I, EDWIN J. BARTELLS, citizen of the United States, residing at Seattle, in the county of King and State of Washington, have invented a certain new and useful Improvement in Cameras, of which the following is a specification.

My invention relates to improvements in cameras of that class which operate to make photographic negatives on successive portions of a roll of sensitized film disposed on a spool from which such successive portions may be unrolled, then exposed to the object to be photographed and then rolled upon another spool in a manner well known to those skilled in the art, and the object of my improvements is to provide a photographic camera which shall embody mechanism whereby successive portions of a film, each of the same required length, may be unrolled from a spool and successively disposed accurately in a proper position for exposure in response to the pulling of a string and without any visual attention on the part of the operator, and whereby a double exposure of any one portion of such film may be prevented. I attain this object by devices illustrated in the accompanying drawings wherein—

Figure 1:
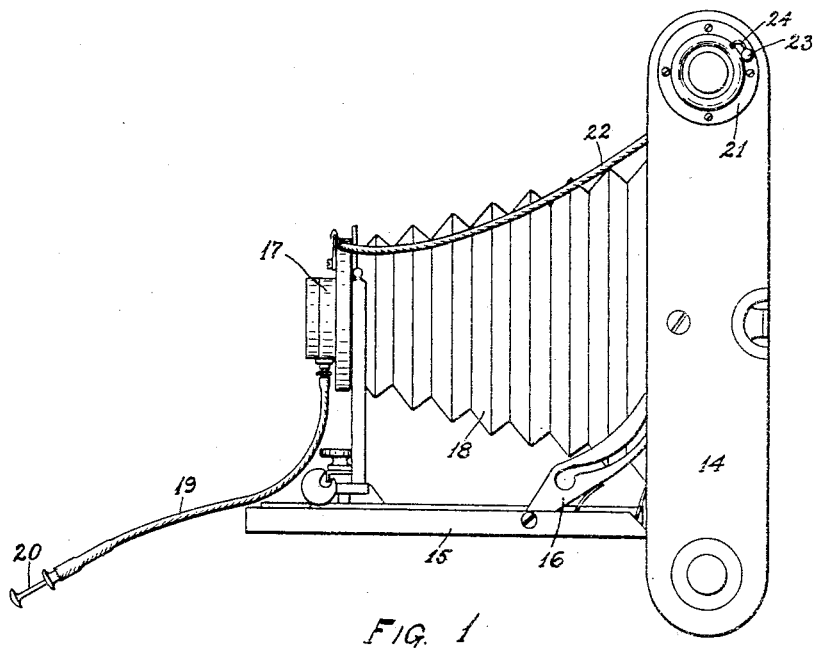
Figure 2:
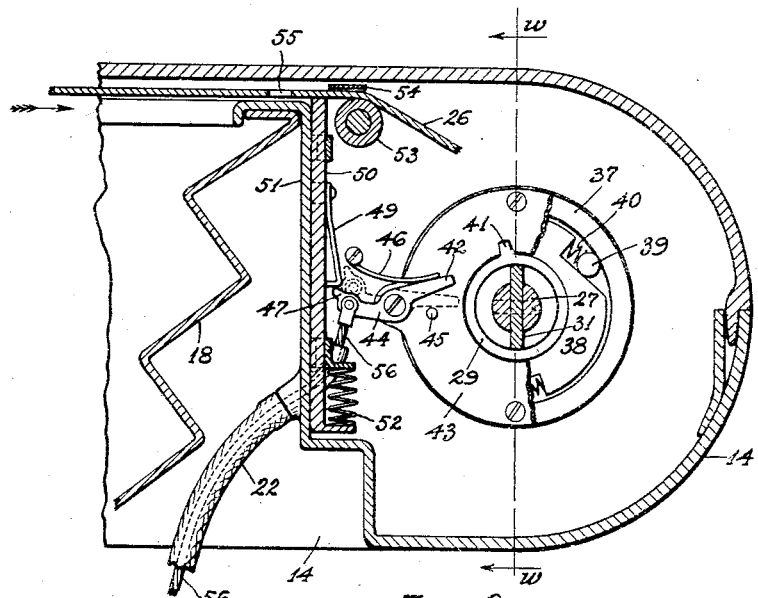
Figure 7:
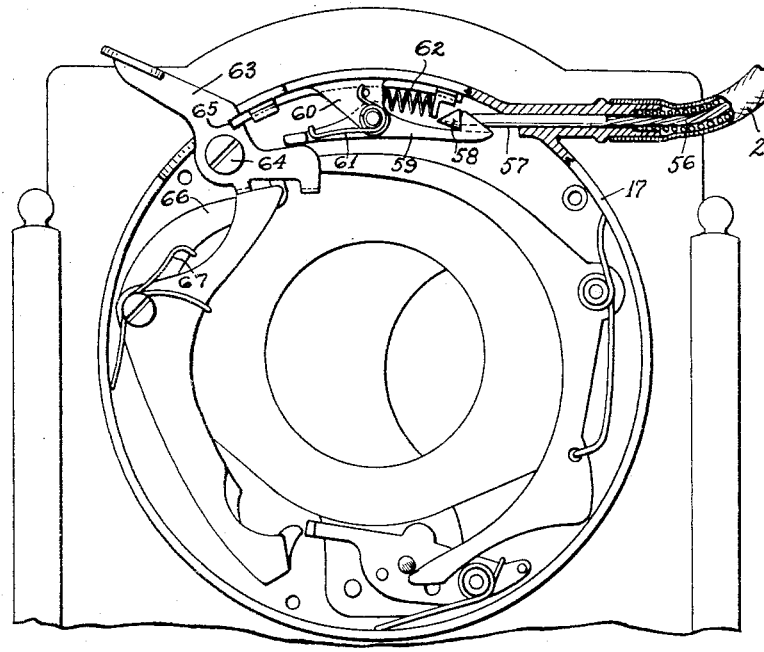
Figure 8:
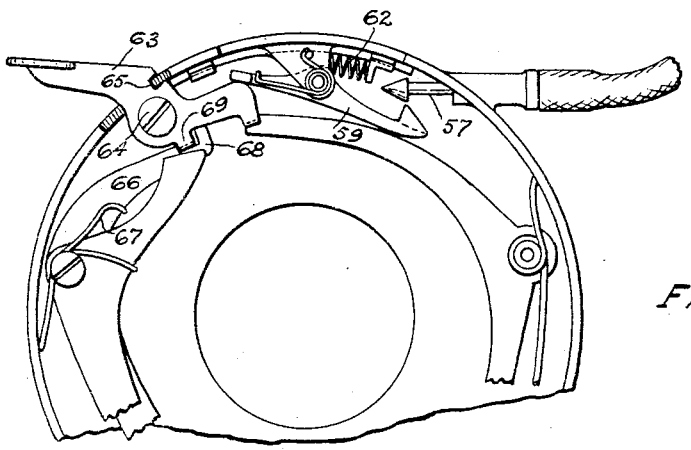
Figure 9:
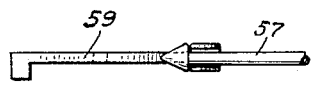
Figure 10:
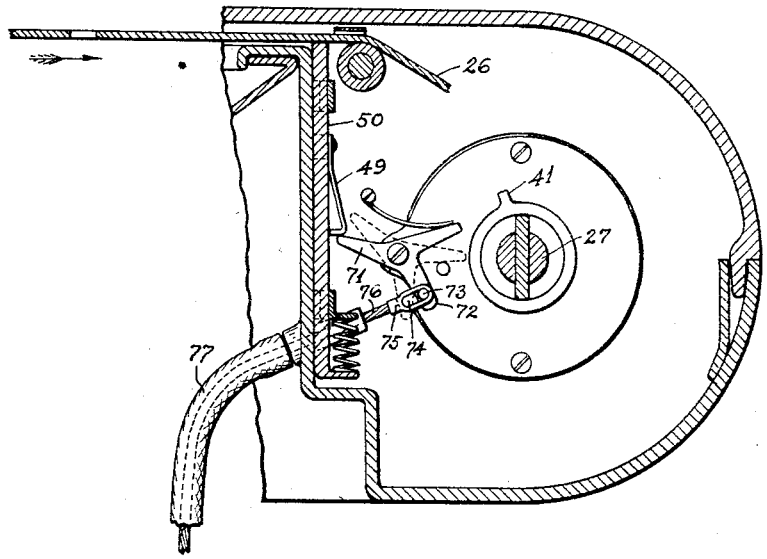
Figure 11:
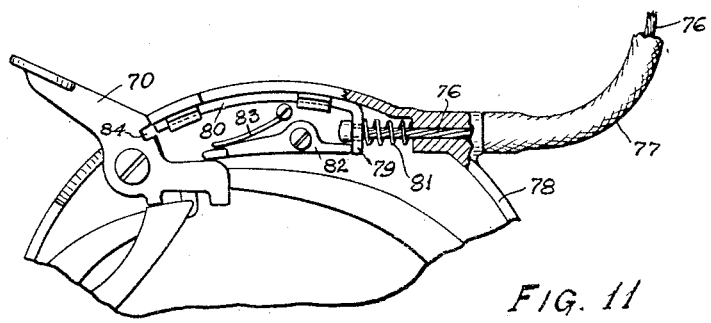
Figure 12:
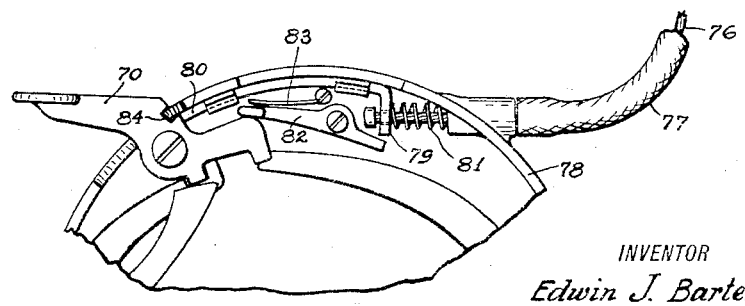

Figure 1 is a view in side elevation of a camera in position for exposing its film; Fig. 2 is an enlarged fragmentary view of the same in vertical section on broken line $x, x$ of Fig. 3; Fig. 3 is an enlarged fragmentary view of the same in vertical section on broken line $w, w$ of Fig. 2; Fig. 4 is an enlarged fragmentary view of the same in vertical section on broken line $z, z$ of Fig. 3; Fig. 5 is an enlarged fragmentary view of the same in vertical section on broken line $y, y$ of Fig. 3; Fig. 6 is an enlarged plan view of a fragment of the same; Fig. 7 is an enlarged view in front elevation of some associated parts of the same; Fig. 8 is an enlarged view in front elevation of some of the parts shown in Fig. 7 as they are disposed at a certain stage of operation; Fig. 9 is a view in side elevation of details of my invention; Fig. 10 is a view similar to Fig. 2 in which is shown a modified form of parts of my invention; and Figs. 11 and 12 are views corresponding to Figs. 7 and 8 but which show a modified form of parts of my invention.

Referring to the drawings, throughout which like reference numerals indicate like parts, Fig. 1 shows a camera embodying my invention by a view in side elevation wherein 14 is an inclosing case whose front wall portion 15 is opened and swung outwardly to a horizontal position, where it is held by articulated supports like the support 16 of well known form, and upon the top of said wall portion 15 is the outwardly extended object-lens case 17 associated with the bellows-like member 18. Attached to the object-lens case 17 is a flexible tube 19 within which is a wire cable, like the cable 56 of Fig. 2, to which is attached a plunger 20 which may be pressed to operate the shutter mechanism disposed within said object-lens case 17. Extending between the object-lens case 17 and the film-moving mechanism that is disposed behind a cover 21 of an annular metal case (not shown in said Fig. 1), is another flexible tube 22 within which is a wire cable 56, shown in Fig. 2, to form a flexible rod whereby said film-moving mechanism may govern the operation of said shutter mechanism. A ball 23 is attached to a string 24 whereby said string 24 may be pulled to move a new portion of a film to its position for exposure in a manner hereinafter described.

Referring now to Figs. 2, 3, 4, 5 and 6, a spool 25, of well known form, is disposed transversely in one end portion of the inclosing case 14 and adapted to be rotated to roll on to it the exposed portions of a film 26 by turning a knob 28 of a shaft 27 upon one end of which one end of said spool 25 is mounted in a manner well known, the unexposed portions of said film 26 being rolled on a similar spool, not shown. disposed in the opposite end portion of said inclosing case 14. The shaft 27 extends through a sleeve 29 in which it is movable only in an endwise direction to adapt it to be drawn outwardly against the force of a helical compression spring 30 whereby it may be disengaged from the end of the spool 25 in the operation of removing the spool 25 from the case, said shaft 27 having its spool engaging end provided with a cross-bar 31 which is adapted to enter a slot formed in the end of the spool 25. The sleeve 29 is rotatably mounted in bearings formed in an annular metal case 32 and by an inwardly projecting flange portion 33 of the cover 21. Freely mounted on said sleeve 29, adjacent to the flange 33 of the cover 21, is a reel 34 which is connected with the flange 33 through the medium of a clock-spring 48, the inner end of said clock-spring 48 being secured to said flange 33 while its outer end is connected with a flanged portion of said reel 34, and attached to said reel 34 is a string 24 whose outer end portion projects outwardly through a hole 35 in the cover 21 and to such outwardly projecting end portion of said string 24 is connected a ball 23. The string 24 is so disposed in convolutions around the reel 34 that if the ball 23 is pulled to unwind the string 24 then the reel 34 will rotate to wind the spring 48 more tightly on the flange 33 and to communicate rotary motion to the sleeve 29 and shaft 27 thus to turn the spool 25 to roll on to it the film 26 in an obvious manner. On the back side of the annular case 32 is provided a concentrically disposed integral annular flange 37 which surrounds a flange 38 that is integral with the sleeve 29, which flange 38 is provided with three equi-distantly disposed notches in its peripheral portion, within each of which notches is loosely disposed a roller as rollers 39, more clearly shown in Fig. 2, which rollers 39 are maintained in contact with the inner surface of the flange 37 by helical springs 40, thus forming a roller and ratchet connection between the sleeve 29 and the annular case 32; whereby, after the string 24 has been pulled outwardly to roll the film 26 on the spool 25 then the action of said roller and ratchet mechanism prevents the film 26 from being unrolled from the spool 25. Encircling the sleeve 29 between the hub portion of the reel 34 and the wall of the annular case 32, as shown more clearly in Fig. 5, is another roller and ratchet mechanism, like the roller and ratchet mechanism comprising the rollers 39, spring 40 and notched flange 38 of Fig. 2. Such roller and ratchet mechanism of Fig. 5 serves to lock the reel 34 with the sleeve 33 when the string 24 is pulled to unwind it and serves to permit the reel 34 to be rotated by the spring 48 to wind up the string 24 without rotating the sleeve 33 when the operator releases the string 24. Thus by repeatedly pulling the string 24 successive portions of the film 26 may be placed in position behind the object glass of the camera.

In order that the film 26 may be equally divided and its successive portions be of equal lengths and that portions may be properly disposed for exposure irrespective of the constantly increasing diameter of the roll of film on the spool 25 as successive portions of such film are exposed and replaced by an unexposed portion, I have provided mechanism which may be described as follows: Upon the inwardly projecting end of the sleeve 29 is an integral projection 41 which projects radially therefrom to adapt it in its circular travel to engage with one end 42 of a lever 44 pivotally associated with an annular member 43 secured to the face of flange 37, which one end 42 is limited in its downward movement by a pin 45 projecting from the annular member 43, such end 42 being subjected to the downward pressure of a flat spring 46 secured to the inner side of the case 14, thus normally to maintain such end portion 42 of the lever 44 to engage with said pin 45. The other end 47 of the lever 44 is disposed to engage with a yielding pawl 49 which is secured to a vertically slidable bolt 50 mounted on a partition 51 in case 14 whereby said lever 44 may operate to raise said bolt 50, in response to the pressure of the flat spring 46, to such height as will permit the end 47 to slip off from the pawl 49 whereupon the bolt 50 will fall in response to the action of a helical spring 52 whereupon the lever 44 will assume the position indicated by dotted lines in Fig. 2, in which position it will rest until the projection 41 is turned to engage with the end 42 to raise such end 42 to cause the end 47 to fall to press the pawl 49 inwardly and pass beneath the end of such pawl 49, whereupon the pawl 49 will spring outwardly again to be in the path of the end 47 of the lever 44, and the projection 41 then having passed the end 42 of the lever 44, the spring 46 will tend again to raise the bolt 50, which, however, will be prevented from rising by the film 26 with which the upper end of said bolt 50 engages; which film 26 is supported in its travel by a roller 53 there being provided a flat spring 54 disposed to press downwardly on the top surface of the film 26 adjacent to the end of the bolt 50 thus normally to prevent the bolt 50 from rising except when in a movement of the film 26 (in the direction of the arrow shown in Fig. 2) it reaches a point where one of a number of holes, as the hole 55, registers with the upper end of said bolt 50, which holes 55 are disposed at equi-distant points adjacent to one edge of the film 26 thus to divide said film 26 into exposable portions of equal lengths. Thus when the string 24 is pulled the film 26 is moved until a hole 55 registers with the top end of the bolt 50 whereupon the spring 46, acting through the lever 44 and the pawl 49, will raise the bolt 50 through such hole 55 to interrupt the movement of the film 26, and when the point 47 of the lever 44 slips off the pawl 49 the bolt 50 will immediately fall, but in the meantime the unwinding of the string 24 will be interrupted and then such string 24 may be released to be again rewound on the reel 34 and the film 26 will have been stopped in the right position for the exposure of one of its successive portions, thus obviating the necessity of marking or numbering successive portions of a film and then observing such marks during the operation of moving an unexposed portion of a film to its proper position with respect to the object-lens of the camera. Manifestly, by such mechanism successive portions of the film 26 may be set in proper position without observations or care on the part of the operator irrespective of the increasing diameter of the roll of film on the roller 27, and since such roller 27 must be turned at least one revolution in each operation of moving the film to expose a new portion, the lever 44 is sure to be actuated to reset the bolt 50 in a position to project its upper end through the next hole 55.

In order to prevent a double exposure of any one of the successive sections of a film 26 I have provided mechanism which will lock the shutter mechanism after an exposure has been made of a given section until the film 26 is again moved to place its next succeeding section in position for exposure, which mechanism may be described as follows: Secured to the partition 51, as shown in Fig. 2, is the end of a flexible tube 22 which extends to and connects with the object-lens case 17 as indicated in Fig. 1. Articulated with the end portion 47 of the lever 44 is one end of a flexible wire cable 56 which cable extends downwardly and diagonally through the partition 51, thence into and through the flexible tube 22 to terminate inside of said lens-object case 17; thus an oscillating movement of the lever 44 will cause endwise movements of the wire cable 56 in the tube 22. As shown in Fig. 7 to the end of the cable 56, which leads into the object-lens case 17, is attached a longitudinally guided and movable rod 57 whose inner end is provided with a barb-like catch 58 which in a cam-like manner is adapted to depress and then be locked by the hook-like end of a lever 59 when the cable 56 moves to force the rod 57 inwardly; said lever 59 being pivotally mounted on a support 60 which is slidably secured in supporting guides fixed on the inner side of the object-lens case 17, and a spring 61 is associated with the lever 59 and the support 60 in a manner to adapt it to exert its force to tend to cause the hook-like end of said lever 59 to move into the path of the barb-like catch 58. Associated with slidable support 60 is a helical compression spring 62 which tends to force said slidable support 60 to move toward and against a shutter-releasing lever 63, which is pivoted to the object-lens case 17 by a pivot-screw 64, whereby the end of said slidable support 60 may be caused to enter a slot 65 formed in said lever 63 when said lever 63 has been released by the operator after actuating such lever 63 to make an exposure of one of the portions of the film 26, thus to lock said lever 63, in the position shown in Fig. 7, to prevent a second exposure of that portion of the film 26. When, however, the film 26 is moved, to place a new portion in position for exposure by pulling the string 24, then the lever 44 (shown in Fig. 2) will be actuated to move in position shown by dotted lines in said Fig. 2 and thereby the wire cable 56 will be pulled to cause the barb-like catch 58 to act on the lever 59 to pull the slidable support 60 away from the lever 63 to unlock it ready for being again actuated by the operator to expose the succeeding one of the successive portions of the film 26; thus, it is obvious that two exposures of the film cannot be effected.

The shutter releasing lever 63 is associated with shutter controlling mechanism of a well known standard form, some parts of which are shown in Figs. 7 and 8, which parts are not necessary to describe since I make no claim for such parts; and such shutter releasing lever 63 may be actuated by the operator's fingers or it may be operated by one of the forms of pneumatic or mechanical devices well known to those skilled in the art.

In Fig. 9 I have illustrated the lever 59 and the rod 57 with its barb-like catch 58 showing the manner of their engagement when locked together. In order to make a time exposure of a section of a film, a lever 66, of well known form shown in Fig. 8, is permitted, by the operation of well known means not shown, to be actuated by a spring 67 to engage its notched upper end with a downwardly projecting portion 69 of the lever 63 to lock such lever 63 in the position shown in Fig. 8 for a time exposure and when the time of such exposure has expired said lever 66 is moved against the force of the spring 67 to release the lever 63 to permit it to return to the position shown in Fig. 7 to close the shutter in a well known manner.

In Figs. 10, 11 and 12 I have illustrated a modified form of device for locking the shutter-releasing lever of a camera embodying my invention, in which Figs. 10, 11 and 12 a shutter-releasing lever 70 corresponds to the lever 63 of Figs. 7 and 8 while the lever 71 corresponds to the lever 44 of Fig. 2. The lever 71 is provided with a projecting arm 72 in the end portion of which is a stud 73 which projects freely into an oblong hole 74 formed in a connector 75 which is attached to one end of a cable 76 which extends through a flexible tube 77 to project into an object-lens case 78, as shown in Figs. 11 and 12, where its other end is swiveled to the angular end portion 79 of a bolt 80; the stud 73 thus serving to pull the cable 76 outwardly from the tube 77 in response to a movement of the lever 71 from a position indicated by dotted lines to its position shown in full lines in Fig. 10, but when said lever 71 moves back to the position shown by the dotted lines then such stud 73 moves in the slot 74 without affecting the cable 76. The bolt 80, (which corresponds to the slidable support 60 of Figs. 7 and 8) is adapted to be moved against the shutter-releasing lever 70 by means of a helical spring 81, which is disposed to surround the cable 76 between the angular end portion 79 and the wall of the object-lens case 78, when not intercepted by one end of a pivoted trip-lever 82 whose other end is yieldingly pressed against one end portion of the shutter releasing lever 70 by a flat spring 83; thus when the lever 70 is actuated to operate the shutter by pressing its outwardly extending end, the trip-lever 82 is moved to disengage its end from the angular end 79 of the bolt 80 whereupon the spring 81 will shove said bolt 80 to the position shown in Fig. 12 at the same time pulling the cable 76 in a direction toward the object-lens case 78 and when the operator releases the lever 70 it will move to a position where the end of the bolt 80 will shoot into the notch 84 to lock such lever until it is unlocked by the operation of rolling the film 26 to place a succeeding unexposed portion in line with the object-lens and by its movement into such position said lever 70 permits the lever 82 to assume a position wherein the lever 82 may again intercept the angular end portion 79 of the bolt 80 when the cable 76 is pulled in a direction outwardly from the object-lens case 78 by the movement of the lever 71 in response to the operation of replacing an exposed portion of a film by an unexposed portion thereof. The position of the shutter releasing lever 70 shown in Fig. 12 corresponds to the position of the lever 63 shown in Fig. 8 in which positions such levers permit a time exposure of a portion of the film as hereinbefore described with respect to the structure of Fig. 8.

Manifestly, by my invention as illustrated and described an operator may pull the string 24 each time that he wants to take a picture without any care with respect to accurately placing a new portion of the film for exposure and such operator cannot expose any one portion of such film more than once, moreover, if the string 24 breaks or if the mechanism connected with the reel 34 becomes defective the operator may use the knob 28 in the place of such string 24 in the operation of moving the film.

Obviously, changes may be made in the forms, dimensions and arrangement of parts of my invention without departing from the spirit thereof.

What I claim is:

1. In a photographic camera which is adapted to effect successive movements of a sensitized film to place successive equal portions of such film in position for exposure said film being perforated at points registering each with an imaginary line dividing adjacent ones of said equal portions, the combination with a spool upon which may be rolled exposed portions of a film, of a shaft adapted to communicate rotary motion to said spool; a sleeve mounted in a fixed circumferential position on said shaft; a reel rotatably mounted on said sleeve; suitably supported bearings within which said sleeve is disposed to be rotatable; a clock-spring disposed to connect said reel with one of said bearings; clutch mechanism interposed between said reel and said sleeve for communicating rotary motion from said reel to said sleeve only in one direction; a string attached to said reel and normally disposed in convolutions therearound to adapt it to be pulled to rotate said reel to cause it to rotate said sleeve and to wind up said clock-spring whereby said clock-spring may then rotate said reel in an opposite direction to rewind said string thereon without rotating said sleeve; and means associated with said shaft to prevent it from rotating in a direction to unroll a film from said spool with which it is connected.

2. In a photographic camera which is adapted to effect successive movements of a sensitized film to place successive equal portions of such film in position for exposure, the combination with a spool upon which may be rolled exposed portions of a film, of a shaft adapted to communicate rotary motion to said spool; a sleeve mounted in a fixed circumferential position on said shaft; a reel rotatably mounted on said sleeve; suitably supported bearings within which said sleeve is disposed to be rotatable; a clock-spring disposed to connect said reel with one of said bearings; clutch mechanism interposed between said reel and said sleeve for communicating rotary motion from said reel to said sleeve only in one direction; a string attached to said reel and normally disposed in convolutions therearound to adapt it to be pulled to rotate said reel to cause it to rotate said sleeve and to wind up said clock-spring whereby said clock-spring may then rotate said reel in an opposite direction to rewind said string thereon without rotating said sleeve; and means associated with said shaft to prevent it from rotating in a direction to unroll a film from said spool with which it is connected.

3. In a photographic camera which is adapted to effect successive movements of a sensitized film to place successive equal portions of such film in position for exposure, said film being perforated at points registering each with an imaginary line dividing adjacent ones of said equal portions, the combination with a spool upon which may be rolled exposed portions of a film, of a shaft adapted to communicate rotary motion to said spool; a sleeve mounted in a fixed circumferential position on said shaft; a reel rotatably mounted on said sleeve; suitably supported bearings within which said sleeve is disposed to be rotatable; a clock-spring disposed to connect said reel with one of said bearings; clutch mechanism interposed between said reel and said sleeve for communicating rotary motion from said reel to said sleeve only in one direction; a string attached to said reel and normally disposed in convolutions therearound to adapt it to be pulled to rotate said reel to cause it to rotate said sleeve and to wind up said clock-spring whereby said clock-spring may then rotate said reel in an opposite direction to rewind said string thereon without rotating said sleeve; means associated with said shaft to prevent it from rotating in a direction to unroll a film from said spool with which it is connected; a lug disposed to project radially from the inner end portion of said sleeve; a lever pivotally mounted to a suitable support by a pivot screw extending through its central portion and disposed with one of its ends in the path of said lug; a bolt mounted on suitable supports to be vertically slidable thereon and disposed to adapt it to engage its top end with the under surface of a film in the path of the perforations therein; and a pawl-like device attached to said bolt and disposed to adapt it releasably to engage with the other end of said lever whereby said lever may operate to raise said bolt through a perforation in said film to intercept the movement thereof.

4. In a photographic camera which is adapted to effect successive movements of a sensitized film to place successive equal portions of such film in position for exposure, said film being perforated at points registering each with an imaginary line dividing adjacent ones of said equal portions, the combination with a spool upon which may be rolled exposed portions of a film, of a shaft adapted to communicate rotary motion to said spool; a sleeve mounted in a fixed circumferential position on said shaft; a reel rotatably mounted on said sleeve; suitably supported bearings within which said sleeve is disposed to be rotatable; a clock-spring disposed to connect said reel with one of said bearings; clutch mechanism interposed between said reel and said sleeve for communicating rotary motion from said reel to said sleeve only in one direction; a string attached to said reel and normally disposed in convolutions therearound to adapt it to be pulled to rotate said reel to cause it to rotate said sleeve and to wind up said clock-spring whereby said clock-spring may then rotate said reel in an opposite direction to rewind said string thereon without rotating said sleeve; means associated with said shaft to prevent it from rotating in a direction to unroll a film from said spool with which it is connected; a lug disposed to project radially from the inner end portion of said sleeve; a lever pivotally mounted to a suitable support by a pivot screw extending through its central portion and disposed with one of its ends in the path of said lug; a bolt mounted on suitable supports to be vertically slidable thereon and disposed to adapt it to engage its top end with the under surface of a film in the path of the perforations therein; a pawl-like device attached to said bolt and disposed to adapt it releasably to engage with the other end of said lever whereby said lever may operate to raise said bolt through a perforation in said film to intercept the movement thereof; an object-lens; a shutter mechanism associated with said object lens; and a connector device disposed to connect said lever with operative mechanism associated with said shutter mechanism whereby said shutter mechanism may be locked at required times in response to a movement of said lever.

5. A photographic camera which is adapted to effect successive movements of a sensitized film successively to place equal portions of such film in position for exposure said film being perforated at points registering each with an imaginary line dividing adjacent ones of said equal portions, and which embodies an extensible inclosing case; an object-lens; shutter mechanism adapted to be operated to permit rays of light to pass through said object-lens at desired times and normally to intercept such rays of light; means for mounting a spool of sensitized film to be rotatable in one end portion of said inclosing case; means for mounting another empty spool to be rotatable in the opposite end portion of said inclosing case said empty spool being adapted to roll on to it the film contained on the first named spool; rotative means for rotatably moving said empty spool at desired successive times to roll on to it successive portions of a film contained on the first named spool; locking mechanism associated with said shutter mechanism and adapted to be operated to prevent the operation of said shutter mechanism at required times; and mechanism associated with said rotative means and with said locking mechanism whereby said locking mechanism may be operated in response to the operation of said rotative means.

In witness whereof, I, hereunto subscribe my name this 19th day of May A. D., 1915.

EDWIN J. BARTELLS.

Witnesses:
A. HASKIN,
FRANK WARREN.

Copies of this patent may be obtained for five cents each, by addressing the "Commissioner of Patents, Washington, D. C."